(12) United States Patent
Vuong et al.

(10) Patent No.: US 9,092,638 B2
(45) Date of Patent: Jul. 28, 2015

(54) SYSTEM AND METHOD FOR MANAGING DOCKING APPLICATIONS FOR A PORTABLE ELECTRONIC DEVICE

(75) Inventors: Thanh Vinh Vuong, Kitchener (CA); Mihal Lazaridis, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1979 days.

(21) Appl. No.: 11/839,670

(22) Filed: Aug. 16, 2007

(65) Prior Publication Data
US 2009/0049554 A1 Feb. 19, 2009

(51) Int. Cl.
G06F 21/00 (2013.01)
G06F 21/62 (2013.01)
H04L 29/08 (2006.01)

(52) U.S. Cl.
CPC ........ *G06F 21/6218* (2013.01); *H04L 67/1095* (2013.01)

(58) Field of Classification Search
CPC .................. H04L 67/1095; G06F 21/6218
USPC ......... 726/26; 711/1; 710/303, 304; 717/174; 455/556
See application file for complete search history.

(56) References Cited

U.S. PATENT DOCUMENTS

| | | | | |
|---|---|---|---|---|
| 5,870,683 | A * | 2/1999 | Wells et al. | 455/566 |
| 6,052,556 | A * | 4/2000 | Sampsell | 725/133 |
| 6,529,992 | B1 * | 3/2003 | Thomas et al. | 711/1 |
| 6,654,826 | B1 * | 11/2003 | Cho et al. | 710/62 |
| 7,653,771 | B2 * | 1/2010 | Liberty | 710/303 |
| 7,952,569 | B2 * | 5/2011 | Hunt et al. | 345/179 |
| 2003/0052547 | A1 | 3/2003 | Fischer et al. | |
| 2003/0229655 | A1 * | 12/2003 | Bibas et al. | 707/203 |
| 2004/0064621 | A1 * | 4/2004 | Dougherty et al. | 710/303 |
| 2004/0268005 | A1 * | 12/2004 | Dickie | 710/303 |
| 2005/0060561 | A1 * | 3/2005 | Pearson et al. | 713/194 |
| 2005/0259845 | A1 * | 11/2005 | Dehlin et al. | 382/103 |
| 2005/0272471 | A1 * | 12/2005 | Sherman | 455/561 |
| 2006/0026326 | A1 * | 2/2006 | Hunt et al. | 710/303 |
| 2006/0218549 | A1 * | 9/2006 | Hsu et al. | 717/174 |
| 2006/0233191 | A1 * | 10/2006 | Pirzada et al. | 370/463 |
| 2006/0248252 | A1 * | 11/2006 | Kharwa | 710/303 |
| 2008/0133614 | A1 * | 6/2008 | Scott | 707/202 |

(Continued)

FOREIGN PATENT DOCUMENTS

GB 2424095 9/2006

OTHER PUBLICATIONS

Robert Gray, Mobile agent for mobile computing; May 2, 1996; Dartmouth College, NH; pp: 1-17.*

(Continued)

*Primary Examiner* — Saleh Najjar
*Assistant Examiner* — Peiliang Pan
(74) *Attorney, Agent, or Firm* — Ridout & Maubee LLP (57) ABSTRACT

A system and method is provided for managing one or more docking applications running on a wireless device. The method displays to a user at least one docking application while the wireless device is coupled to another device. The method comprising the steps of: executing a docking application control module when the wireless device is first coupled with the other device; retrieving user preferences associated with the docking application control module; executing, based on the retrieved user preferences, at least one docking application for use on the wireless device while the wireless device remains coupled to the other device; and terminating the docking application when the wireless device ceases to be coupled to the other device.

14 Claims, 6 Drawing Sheets

(56) References Cited

U.S. PATENT DOCUMENTS

2008/0162628 A1* 7/2008 Hill et al. .................. 709/203
2010/0095043 A1* 4/2010 Liberty ..................... 710/303
2014/0115027 A1* 4/2014 Akaiwa et al. ............. 709/201

OTHER PUBLICATIONS

Canadian Intellectual Property Office, "Examiner's Requisition" for corresponding Canadian Patent Application No. 2,638,263, dated Feb. 9, 2012, Canada.
European Patent Office, "Communication Pursuant to Article 94(3) EPC" for corresponding EP Patent Application No. 07 114 4661, dated May 18, 2009, Netherlands.
Canadian Intellectual Property Office, "Examiner's Requisition for corresponding CA Patent Application No. 2,638,263 dated May 9, 2011", Canada.
Dell, Inc. "Dell TM Axim TM X51/X51v Owner's Manual", Rev. A02, 142 pages, Mar. 2006, http://support.dell.com/support/edocs/systems/aximx51/en/om/om_en.pdf.
Babin, Giles—Canadian Intellectual Property Office, "Examiners Requisition" for corresponding Canadian Application No. 2,638,263, dated Oct. 1, 2012, Canada.
Norton Rose, Response to Examination Report dated Nov. 8, 2011, filed in Canadian Patent Application No. 2,638,263.
Norton Rose, Response to Examination Report dated Aug. 9, 2012, filed in Canadian Patent Application No. 2,638,263.
Norton Rose, Response to Examination Report dated Apr. 2, 2013, filed in Canadian Patent Application No. 2,638,263.
European Patent Office, Extended European Search Report dated Nov. 28, 2007, issued in European Patent Application No. 07114466.1.
IPulse, Response to Search Report dated Feb. 18, 2008, filed in European Patent Application No. 07114466.1.
Barker Brettell, Response to Examination Report dated Sep. 17, 2009, filed in European Patent Application No. 07114466.1.
European Patent Office, Summons to Attend Oral Proceedings dated Feb. 22, 2010, issued in European Patent Application No. 07114466.1.
Barker Brettell, Response to Summons to Attend Oral Proceedings dated Apr. 28, 2010, filed in European Patent Application No. 07114466.1.
European Patent Office, Invitation Pursuant to Article 94(3) and Rule 71(1) EPC dated May 21, 2010, issued in European Patent Application No. 07114466.1.
Barker Brettell, Response to Invitation Pursuant to Article 94(3) and Rule 71(1) EPC dated Jun. 3, 2010, filed in European Patent Application No. 07114466.1.
European Patent Office, Intention to Grant dated Jul. 16, 2010, issued in European Patent Application No. 07114466.1.
Canadian Intellectual Property Office, Office Action dated May 23, 2013, issued in Canadian Patent Application No. 2,638,263.
Canadian Intellectual Property Office, Office Action dated Oct. 7, 2014, issued in Canadian Patent Application No. 2,855,788.

* cited by examiner

SYSTEM AND METHOD FOR MANAGING DOCKING APPLICATIONS FOR A PORTABLE ELECTRONIC DEVICE

TECHNICAL FIELD

The present disclosure relates generally to portable devices, and more particularly to a system and method for managing docking applications for a portable electronic device.

BACKGROUND

People increasingly have portable electronic devices, such as cellular phones, personal digital assistants, pagers, etc. Many portable electronic devices are designed to be connected to a personal computer or laptop in order to synchronize contents stored on the personal device with a storage medium located in the personal computer or laptop. Additionally, portable devices are often designed to be connected to a power source so that a battery of the portable device can be recharged. On some occasions, the synchronization and recharging operations are performed at the same time. Either one or both of these operations is often referred to as "docking" the portable device, typically with a cradle or other mechanical mating device that also provides the interface to the power supply and/or personal computer or laptop. Portable devices that are docked typically have limited usefulness while the devices are docked, yet they often sit located on a desk within plain view of the user. Any features that portable devices do offer when docked are typically primitive and difficult to manage, making any practical use of the docked portable device unfeasible. Additionally, portable devices are often insecure when in their docked states, providing the user with little or no protection against prying eyes.

BRIEF DESCRIPTION Of THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

One aspect of the description provides a method for managing one or more docking applications running on a wireless device. The method displays to a user at least one docking application while the wireless device is coupled to another device. The method comprises the steps of: executing a docking application control module when the wireless device is first coupled with the other device; retrieving user preferences associated with the docking application control module; executing, based on the retrieved user preferences, at least one docking application for use on the wireless device while the wireless device remains coupled to the other device; and terminating the docking application when the wireless device ceases to be coupled to the other device.

Another aspect of the description provides a wireless device for displaying to a user one or more docking applications while the wireless device is coupled to another device. The wireless device comprises a microprocessor for controlling operation of the wireless device; a first input device coupled to the microprocessor for accepting an input from a user of the wireless device; a first serial port coupled to the microprocessor for providing the option of establishing a serial connection between the other device and the wireless device; a display device coupled to the microprocessor for communicating an output to the user; a communications subsystem coupled to the microprocessor for communicating with a communications network; and a memory coupled to the microprocessor. The wireless device includes a docking application control module resident in the memory for execution by the microprocessor. The docking application control module is configured to: execute when the wireless device is first coupled with the other device; retrieve user preferences associated with the docking application control module; execute, based on the retrieved user preferences, at least one docking application for use on the wireless device while the wireless device remains coupled to the other device; and terminate the docking application when the wireless device ceases to be coupled to the other device.

Figure 1:
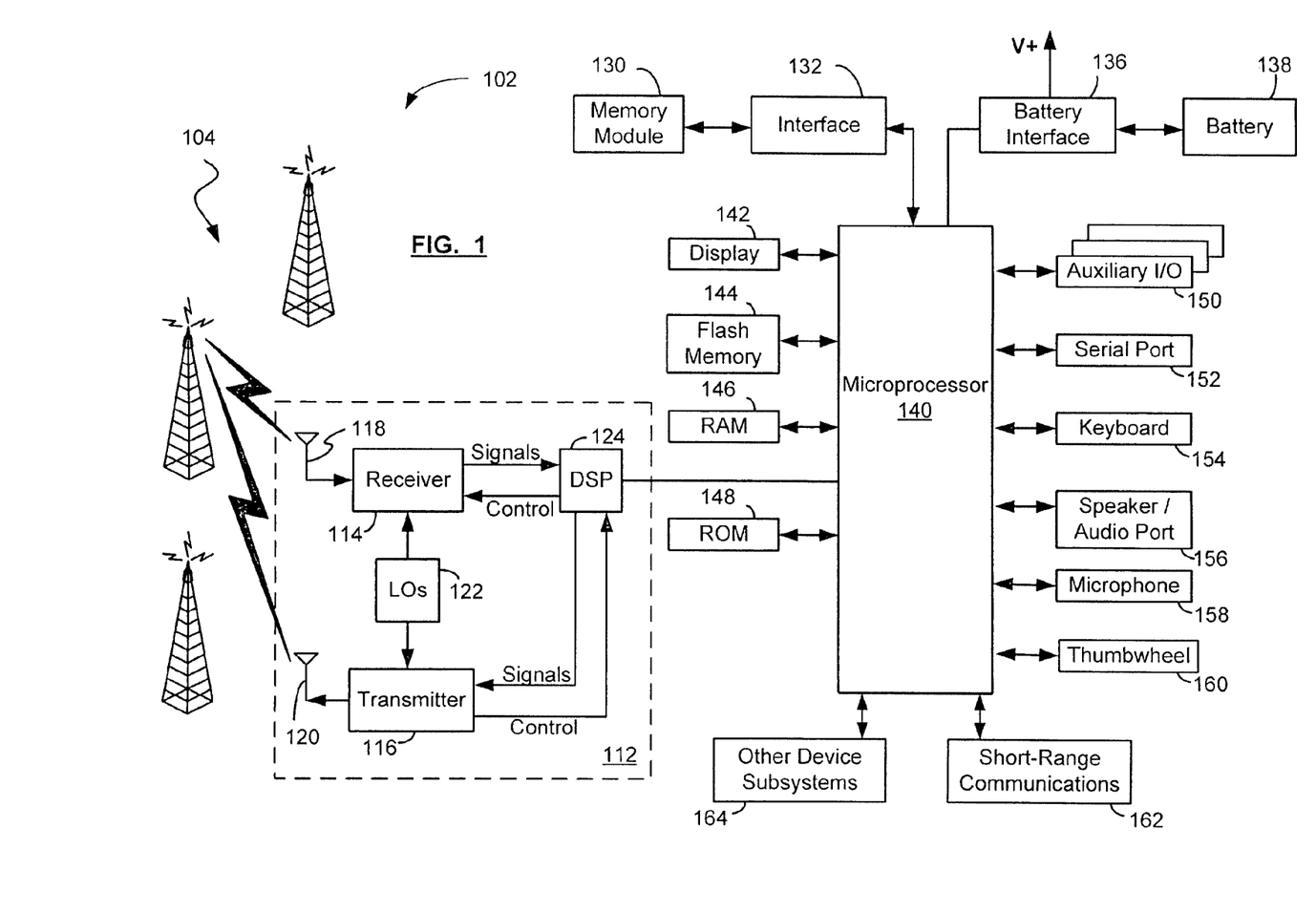
FIG. 1 shows in block diagram form a wireless device suitable for running a docking control application in accordance with one embodiment.

Reference is first made to FIG. 1, which shows a block diagram illustrating a portable wireless device 102 suitable for running a docking control application in accordance with one embodiment of the present disclosure. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one embodiment, the wireless device 102 is a two-way communication device having at least voice and data communication capabilities, including the capability to communicate with other computer systems. In one embodiment, the wireless device 102 is a handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), or a portable media or music player. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In one embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the repaired network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a data port such as serial port 152, a keyboard or keypad 154, a speaker or audio port 156 for connecting to, for example a set of headphones, a microphone 158, a clickable thumbwheel, thumbwheel, or set of scroll buttons 160, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the clickable thumbwheel 160, for example, may be used for both communication-related functions, such as entering a text message for transmission over the wireless network 104, and executing device-resident functions such as a calculator or task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. The wireless device 102 may also include a media player application for playing media files such as video files (e.g., .VOB, .AVI, .WMW, or .MPG), audio files (e.g., .MP2, .MP3, .MP4, .AAC, .WAV), or displaying picture files, or displaying any other type of media file known to those skilled in the art. The wireless device 102 may also include docking applications and/or docking application control software that may be executed when the wireless device 102 is docked with a docking station or placed in a cradle. The docking applications and docking control software will be described in more detail below in connection with FIGS. 3 and 6. Naturally, one or more memory stores are available on the wireless device 102 to facilitate storage of media file data items and other information, such as the flash memory 144, the RAM 146, the ROM 148, the memory module 130, or other types of memory storage devices or FLASH memory cards represented by the other device subsystems 164, such as Secure Digital (SD) cards or mini-SD cards, etc.

The PIM and/or media applications have the ability to send and receive data items via either the wireless network 104 or a link to a computer system. The link to the computer system may be via the serial port 152 or the short-range communications subsystem 162. In one embodiment, PIM and/or media data items are seamlessly combined, synchronized, and updated via the wireless network 104, with the wireless device user's corresponding data items stored and/or associated with a host computer system thereby creating a mirrored or partially mirrored host computer on the wireless device 102 with respect to such items. This is advantageous where the host computer system is the wireless device user's office computer system. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the clickable thumbwheel 160 in conjunction with the display 142 and possibly the auxiliary I/O device 150. The keypad 154 may be either a complete alphanumeric keypad or telephone-type keypad. These composed items may be transmitted through the communication subsystem 112 over the wireless network 104 or via the short range communication subsystem 162.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information, media file, or software downloads to the wireless device 102 other than through the wireless network 104. The alternate download path may, for example, be used to load media files onto the wireless device 102 through a direct, reliable and trusted connection to thereby provide the user of the device 102 with media files to view and/or listen to using a media application of the device 102. The serial port of the user's computer may be connected with a serial cable to a docking or cradle apparatus that may be designed to physically hold the device 102 in a position such that the display 142 is visible to the user while the device 102 is docked or cradled. The docking apparatus may have electrical contacts to facilitate an interface for the serial connection between the serial port 152 and the user's computer such that the device 102 may be docked and connected to the user's computer by simply dropping or placing the device 102 in the cradle.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b, 802.11g, and/or 802.11n.

Figure 2:
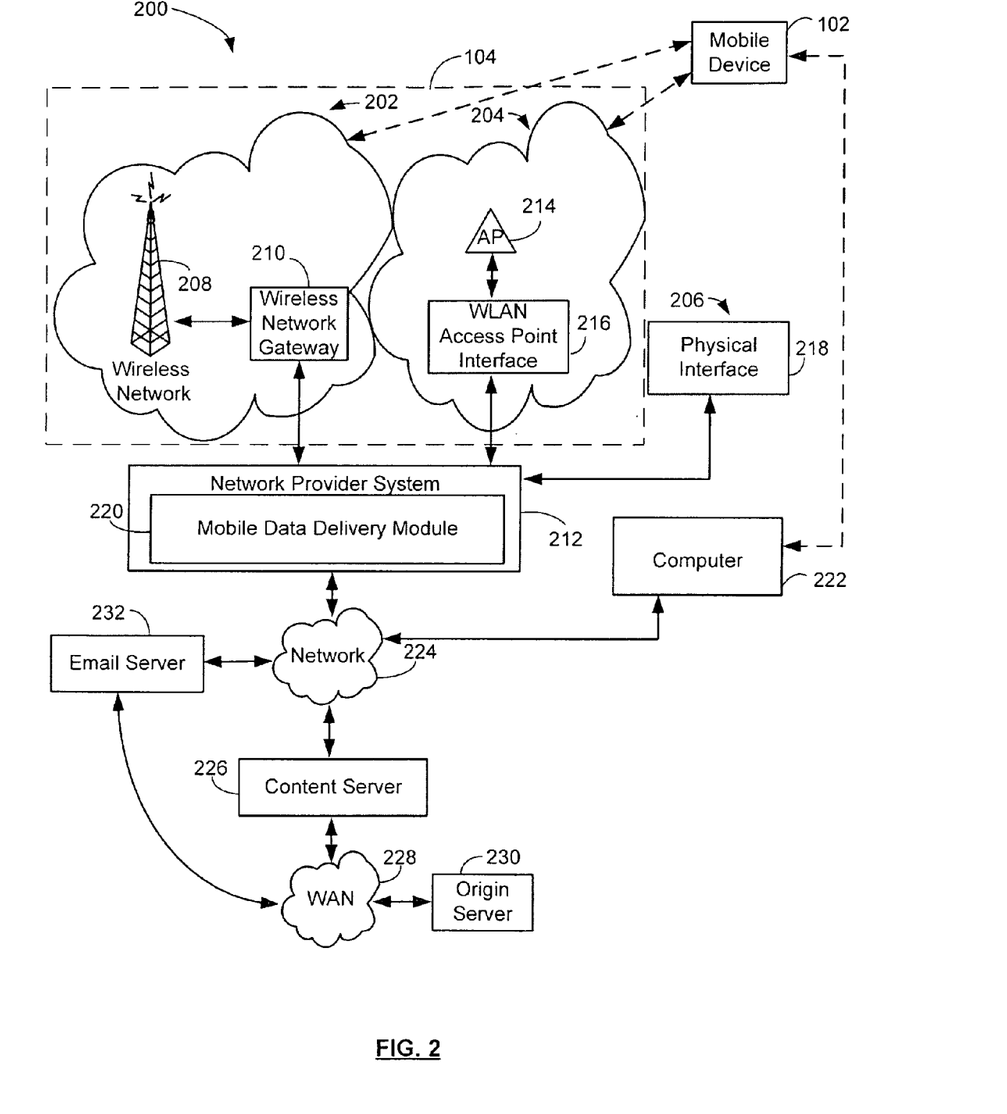
FIG. 2 shows in block diagram form a communication system suitable for providing the operating environment of the wireless device of FIG. 1 in accordance with one embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), IDEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO).

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as 802.11b, 802.11g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to one embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In one embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial connection between the mobile device 102 and the computer 222. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one embodiment, the mobile data delivery module 220 provides connectivity between the wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
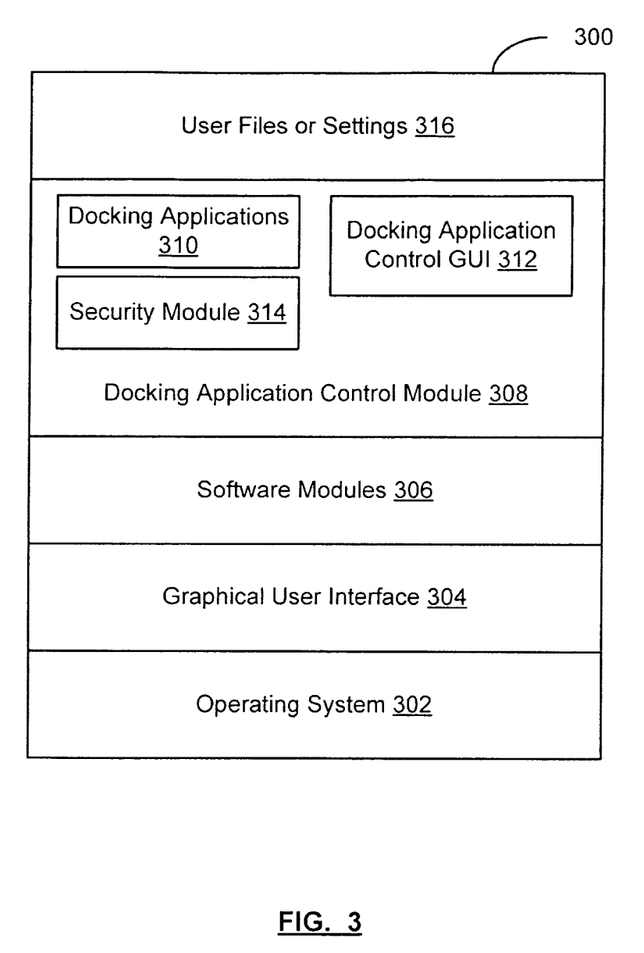
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with one embodiment, the wireless device 102 is a portable media player intended to allow the user to listen to audio files and/or watch video files on the go. In accordance with another embodiment, the wireless device 102 is intended to be a multi-tasking wireless communications device configured for sending and receiving data items and for making and receiving voice calls that also includes various applications enabling users to listen to music, watch video files, play games, view picture files, surf the internet wirelessly, etc. To provide a user-friendly environment to control the operation of the wireless device 102, an operating system (OS) 302 resident on the wireless device 102 provides a basic set of operations for supporting various applications typically operable through a graphical user interface (GUI) 304. For example, the operating system 302 provides basic input/output system features to obtain input from the auxiliary I/O 150, the keypad 154, the clickable thumbwheel 160, and other input devices, and to facilitate output to the user via the display 142. The GUI 304 is typically a component of the operating system 302. One or more software modules 306 for managing communications or providing a personal digital assistant (PDA) or other functions may also be included.

The memory 300 also includes an email and calendar client, which may be combined in, for example, a PIM application having email-based calendaring and scheduling functions. Typically, the PIM is installed as one of the software modules 306. The memory 300 also includes a docking application control module 308 for managing functions of the wireless device 102 when it is connected to the computer 222 (e.g., when the device 102 is "docked" or "cradled"). Further included in the memory 300 are docking applications 310, a docking application control graphical user interface (GUI) 312, and a security module 314. The docking applications 310 may optionally be part of the control module 308. In one example, the docking application control module 308 may detect that the wireless device 102 has been connected to the computer 222 (e.g., docked or cradled such as by using a serial cable or by placing the wireless device 102 in a cradle). The docking application control module 308 may launch one of the docking applications 310, such as an alarm clock application, a picture frame application, a slide show application, a download portal, or a media player application for use by the user while the wireless device 102 is docked. The docking GUI 312 of the control module 308 provides an interface to the user to quickly and easily switch between the docking applications 310 while the wireless device 102 is docked and/or adjust settings of one or more of the docking applications 310. The security module 314 ensures that secured or protected content is not displayed on the display 142 of the wireless device 102 while the wireless device 102 is docked and the control module 308 is active. Further content of the wireless device 102 such as media files or user data files or configuration settings belonging to the docking application control module 308 may be stored as user files or settings 316. The docking application control module 308, the docking applications 310, the docking GUI 312, and the security module 314 will be described in more detail below and in connection with FIG. 6.

Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied on a computer readable medium (such as a DVD, CD, floppy disk or other storage media) which may be used for transporting the programmed instructions to the memory 300 of the wireless device 102. Alternatively, the programmed instructions may be embedded in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
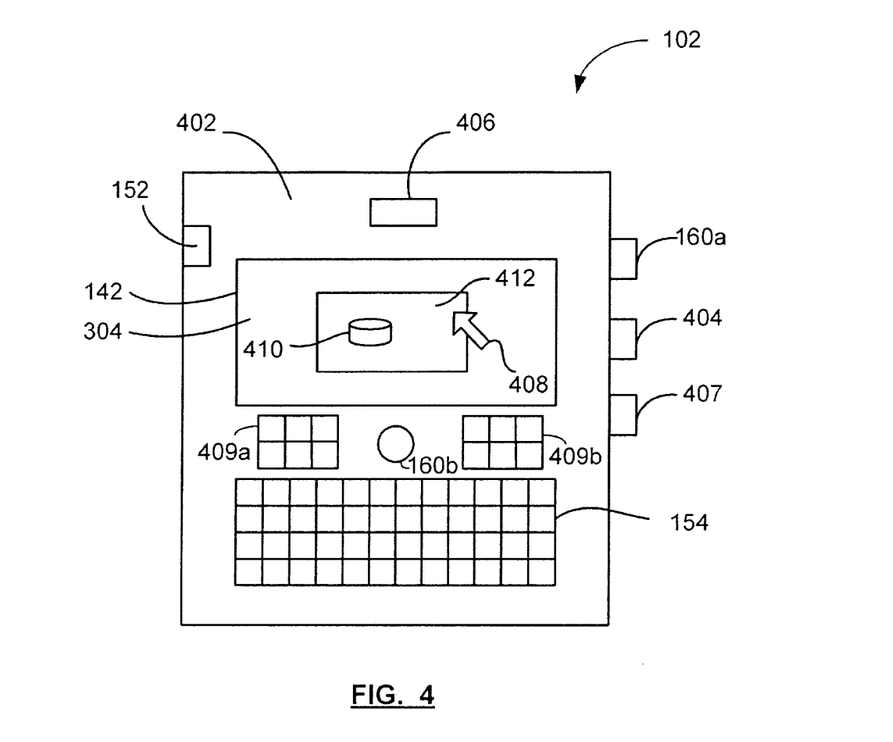
FIG. 4 is a front view illustrating the wireless device of FIG. 1.

Reference is next made to FIG. 4, which shows a front view of the wireless device 102. As mentioned above, the wireless device 102 may be a data and voice-enabled handheld device.

The wireless device 102 includes a casing 402, the data or serial port 152, the display screen 142, the graphical user interface (GUI) 304, the keypad 154, the clickable thumbwheel or scroll buttons 160a or other device for navigation such as a trackball 160b, one or more input buttons 404 (e.g., select, cancel, talk, play, stop, fast forward, rewind, next, previous buttons), signal inputs/outputs 406 (e.g., direct wire connection or inductive coupling power connector input, microphone, speaker, data interface input, etc.), and an audio port 407. Additionally, the wireless device 102 may have a number of navigation control buttons represented by numerals 409a and 409b. The navigation control buttons 409 may provide a number of functions such as a send and/or end key for a mobile telephone application of the wireless device 102, a menu key, an escape key, etc. The functions of the navigation control buttons 409 may be user configurable. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the display screen 142, the clickable thumbwheel 160, etc.

The microprocessor 140 is typically coupled to one or more input devices (e.g., the buttons 404, the keypad 154, the clickable thumbwheel 160) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 300. The microprocessor 140 is typically coupled to a set of stereo headphones connected to either the audio port 407 or connected via a Bluetooth connection when the user wishes to use a media player application to listen to audio files or watch video files.

A user may interact with the wireless device 102 and its software modules 306, the control module 308, and/or the docking applications 310 using the GUI 304. The GUI 304 is controlled by the operating system 302 (FIG. 3) and provides a display format enabling the user to choose commands, execute application programs, manage computer files, and perform other functions by selecting pictorial representations (i.e., icons), or selecting items from a menu through the use of an input or pointing device such as the clickable thumbwheel 160 and/or the keypad 154. Generally, the GUI 304 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user in windows appearing on the display 142. A window 412 is a display area shown within the display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

Figure 5:
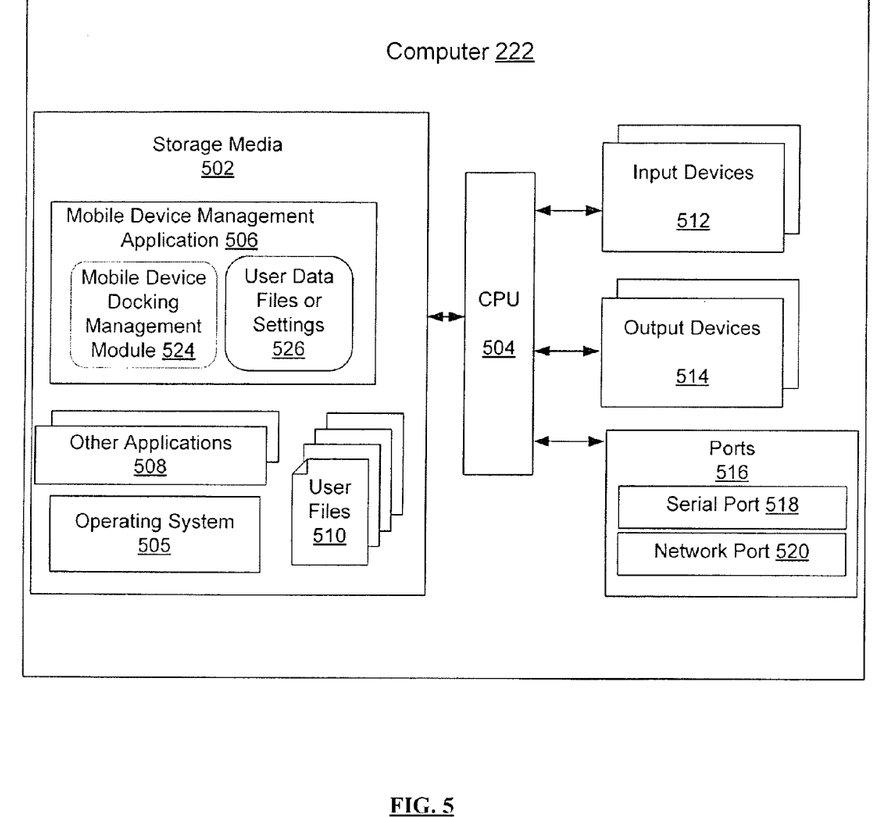
FIG. 5 shows a block diagram of an example computer system that hosts a mobile device docking management module for use with the wireless device of FIG. 1.

Reference is next made to FIG. 5, which is a block diagram illustrating an example of the computer 222, which includes one or more storage media 502 in communication with a central processing unit (CPU) 504. Although the storage media 502 is typically one or more hard-disk drives, the storage media 502 could additionally or alternatively include DVD media, CD media, flash memory, diskettes, RAM and/or other types of media. In some embodiments, various types of software are stored on the media 502 including an operating system 505, a mobile device management application 506 and other applications 508. Also stored on the media 502 are user files 510, such as media files, and user data files or settings 526. In one example, the user data files and/or settings 526 may be a copy of the user files or settings 316 stored on the wireless device 102. In one example, the user data files or settings 316 may be copied to the computer 222 curing a synchronization operation.

The computer 222 further includes one or more input devices 512, one or more output devices 514, and one or more communications subsystems or ports 516 in communication with the CPU 504. Examples of possible input devices include a mouse, keyboard, scanner, microphone, etc. Many of the input devices 512 may not be housed within the computer 222, but may instead provide input through one of the externally exposed ports 516. Examples of the possible output devices 514 include a monitor, a printer, speakers, etc. Many of the output devices 514 may not be housed within the computer 222 and, as such, output signals from the CPU 504 to one of the devices 514 may be transmitted through one of the ports 516. As will be appreciated by those skilled in the art, it is also possible that one or more of the devices 512 and 514 may be a device that is more accurately described as both an input and output device. In an example embodiment, the posts 516 include a serial port 518, such as a USB port, for example for supporting a wired connection to the serial port 152 of the wireless device 102 (FIG. 1) connected either directly or indirectly through a docking station (not shown). In one embodiment, the ports 516 also include a network port 520 for connecting to the network 224 (FIG. 2). The port 520 may comprise an Ethernet 10/100/1000 connector and/or a WLAN communications sub-system. A short-range wireless communications port or antenna may be included for supporting direct wireless communications such as 802.11b/g/n wireless networking, Bluetooth™, or infrared communications with either the wireless device 102 or the wireless network 104.

As indicated above, among the software applications on the computer 222 is a mobile device management application 506 (or suite of applications) which includes computer instructions that are executable by the CPU 504 of the computer 222 to implement, among other things, a mobile device docking management module 524 that facilitates the management of and/or transfer of user files and date from the computer 222 to the wireless device 102 (or vice versa) that is associated with the computer 222. By way of example, the computer 222 and the wireless device 102 may be associated through a common user who has an assigned domain login ID and email account within the system 200. The wireless device 102 may be associated with the user domain ID and email account during activation. When a user logs onto a particular computer 222 using the domain login ID, both the computer 222 and the wireless device 102 are commonly associated with the user and hence each other. Association of the wireless device 102 with the computer 222 could also occur through other means, for example, when a user originally activates the wireless device 102, the wireless device 102 and the computer 222 may exchange IDs and/or addresses by being plugged directly together through a serial connection. In another example, the device may, upon activation, search for other devices through the short-range communications system 162 and present the user with a list of devices to "pair" with; the wireless device 102 and the selected device (e.g., the computer 222) then authenticate each other via a password exchange, and, once paired, the associated devices remember the pairing and password so that future linking between the device is automatically performed.

When the wireless device 102 is connected to the computer 222 for synchronization and/or charging operations using, for example, a serial cable connecting the serial port 152 (FIG. 1) with the serial port 518 (FIG. 5), the state the wireless device 102 enters is referred to as a "docked" or "cradled" state. This operation may or may not include a docking device or cradle that the wireless device is physically placed into or on top of. Typically, when the wireless device 102 is docked, the wireless device 102 sits on the user's desk near the computer 222 with which the wireless device 102 is docked. Typically, the wireless device 102 rests in an orientation that allows the user to see the display screen 142 (FIG. 1). Once the wireless device 102 is docked, a synchronization and/or charging operation commences. In one embodiment, the wireless device 102 need not be connected with the computer 222 in order to be docked. The wireless device may also be connected to a stand-alone charger with a cable where the charger may or may not take the form of a docking device or cradle. Alternatively, the wireless device 102 may be coupled to an inductive changing station with an inductive coupling. The receiving coil of the inductive coupling may either be attached to the wireless device 102 with a cable or the receiving coil of the inductive coupling may be integrated into the wireless device 102 and the wireless device 102 may have a mechanical coupling formation formed in the casing 402 that is designed to mate with an inductive charging station (not shown). Such inductive couplings are known to those skilled in the art.

In one embodiment, when the wireless device 102 is docked and any hand shaking, authentication, and/or presence detection process between the wireless device 102 and the computer 222 has been completed, the docking application control module 308 is launched. The docking application control module 308 has at its disposal the one or more docking applications 310, the docking application control graphical user interface (GUI) 312, the security module 314, and any configuration settings that the user has previously set, which may be stored as the user files or settings 316. The docking applications 310 include applications that are useful to the user while the wireless device 102 sits atop the user's desk, and may include: (a) an alarm clock application that shows the user the time and/or date and may allow the user to set alarms manually or may work in conjunction with the PIM application to remind the user of appointments the user has scheduled; (b) a picture frame application that shows rotating pictures that change either on a set or random interval; (c) an animated picture viewer application, which shows the user animated pictures, optionally with sound, such as a flowing stream or raging waterfall; (d) a data download portal application, which allows the user to download items of interest such as comics, inspirational quotes, bible verses, etc., and display those items on the screen; (e) a radio or media player application that allows the user to listen to and/or view media files while the user works at his desk; and/or (f) a display notification application that displays notifications (e.g., shows the user that he has 3 work emails, 5 messages on his Yahoo account, 6 requests from Facebook, etc.). In one embodiment, the display notification application may be configured to show the notification on the screen while one of the other docking applications 310 is running (i.e., the notifications being transposed on top of another application or the notification application running alongside one or more of the other docking applications 310).

The docking application control module 308 may launch one of the docking applications 310 automatically once the wireless device 102 has been docked. Alternatively, the docking application control module 308 may wait for a predetermined delay period before launching one of the docking applications 310. In one example, the predetermined delay period may be related to the detection of a number of elapsed power save cycles (e.g., once the wireless device 102 has been docked in its cradle, the docking application control module 308 waits two minutes before launching the alarm clock application). In one embodiment, the docking application control module 308 terminates any of the docking applications 310 that are running if and when the wireless device 102 is removed from its cradle. Optionally, the docking application control module 308 may be configured not to terminate docking applications 310 that are running when the wireless device 102 is no longer connected to the computer 222.

The docking application control module 308 provides an interface, such as the docking application control GUI 312, that allows the user to configure any aspects of the functioning of the control module 308. For example, the user is able to select which of the docking applications 310 the user wishes to automatically execute when the wireless device 102 is docked. The user may further be able to define settings particular to any of the docking applications 310, such as the position, size and type of clock or alarm clock to display in the alarm clock application, which pictures to show and the files locations of the pictures to show within the picture frame application, which animated picture files or folder of files to use in the picture frame application, which network locations from which to offer data for the data download portal and any security authentication information needed to access those network locations, which media files or folder(s) of files to make available to the user within the media player application, and any other type of setting related to the cosmetic appearance or functionality of the docking applications 310. Further, the docking application control module 308 may be configured to invoke the docking GUI 312 to provide an application control function (e.g., in the form of buttons appearing on the display screen representing one or more of the docking applications 310, or as a drop-down menu allowing the user to select one of the docking applications 310) as an interface to the user while one of the docking applications 310 is running.

For example, if the alarm clock application is currently running on the wireless device 102, the control module 308 may provide buttons near the edge of the screen (or anywhere on the screen), allowing the user to quickly select one of the other available docking applications 310 (e.g., the control module 303 may provide a picture frame application button, an animated pictures application button, a data download portal button, and a media player application button). If the user chooses to switch to one of these other docking applications by selecting the appropriate button, the button for the application the user chooses may be replaced with a button representing the alarm clock application if the alarm clock application is terminated or temporarily suspended. Alternatively, the docking GUI 312 may present the user with options to run two or more of the docking applications 310 side-byside. Further, the user is able to configure which of the docking applications 310 are to be represented on the display of the wireless device 102 by the application management function.

The security module 314 functions to ensure that content that is displayed by the docking applications 310 is content that is neither sensitive nor confidential data. For example, documents or data files that are stored as the user files 316 have security attributes or profiles associated with them, such as IT protection policies or password protection. The security module 314 blocks access to sensitive data that requires a password to access or is protected under an IT policy, and may include e-mail, contacts stored within the PIM application, etc. The user may have to enter a password to access the wireless device 102 in order to view items that are not permitted to be shown by the security module 314. Examples of non-sensitive data or files may include the date, the time, or picture files, although any file such as a picture file may be "locked" by the user such that the security module 314 will prevent the display of the locked file while the wireless device 102 is docked. In one embodiment, policies related to the security module 314 are user configurable. For example, the user may indicate that emails are not sensitive data, giving rise to the use of an email preview application that previews emails to the user that arrive while the wireless device 102 is docked.

Figure 6:
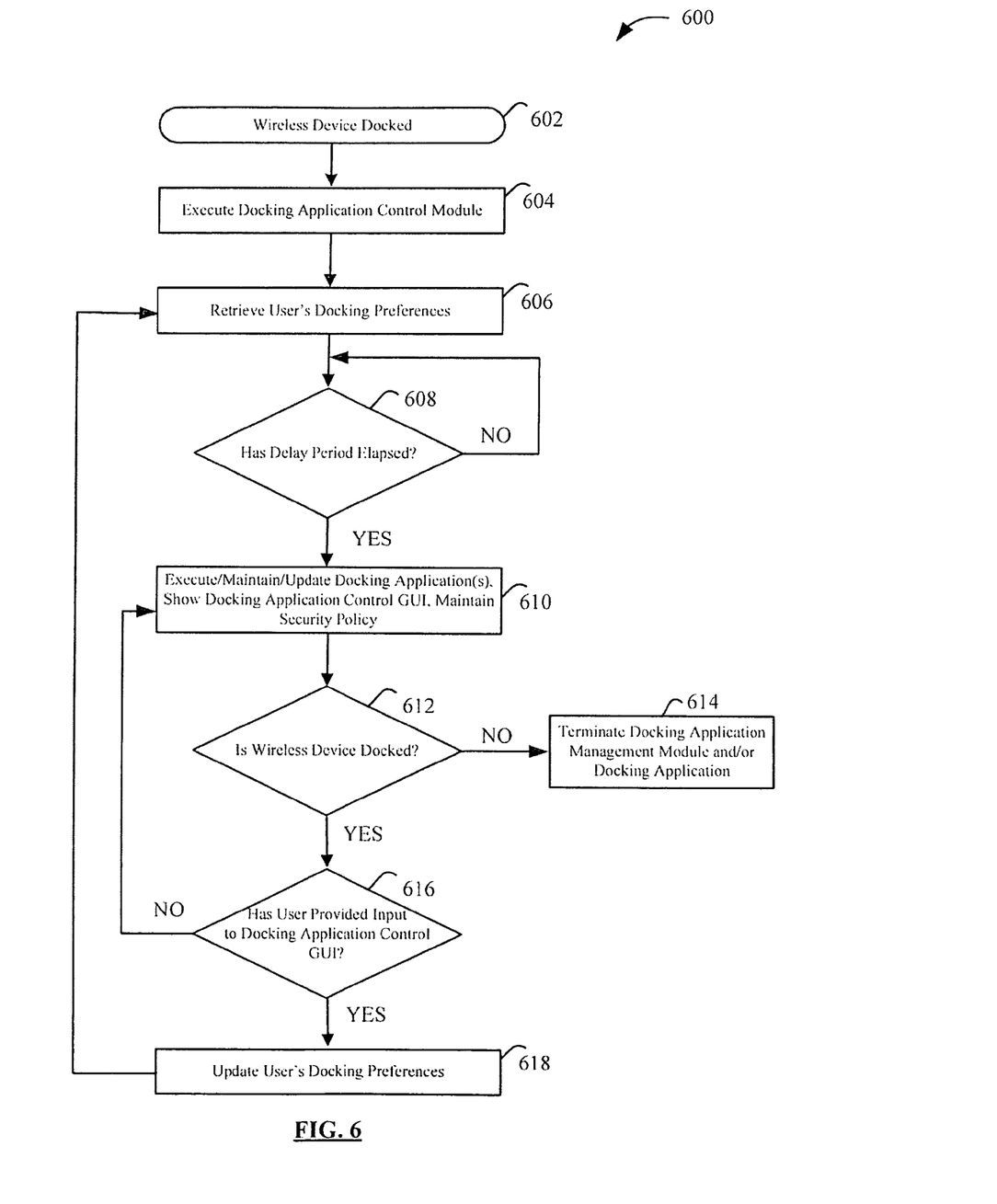
FIG. 6 is a flowchart illustrating a method of managing docking applications in accordance with one embodiment.

Reference is next made to FIG. 6, which shows a flowchart illustrating a method 600 of managing docking applications in accordance with one embodiment. In a first step 602, the wireless device 102 is docked. One example of the wireless device 102 being docked includes connecting the wireless device 102 to the computer 222 using a serial cable to connect the serial port 152 (FIG. 1) of the wireless device 102 with the serial port 518 of the computer 222. This may also include the use of a docking station or cradle, which the wireless device 102 is placed in or on. In another example, the wireless device 102 may be placed in a charging cradle or connected to a USB cable that is connected to any electronic device capable of providing the standard USB charging current. The user may expect that while the wireless device 102 is charging, the wireless device will operate to give the user access to the docking applications 310. Alternatively, the docking of the wireless device 102 may include either a user initiated or the automatic establishment of a wireless network connection (e.g., using either the communication subsystem 112 and the WAN 202 and/or the short-range communications subsystem 162 and the WLAN 204). Once any connection-initiation or handshaking type procedures have been performed and the wireless device 102 is in communication with the computer 222 (if the wireless device 102 is connected to the computer 222), the wireless device is docked and the docking application control module 308 is executed (step 604). Once the docking application control module 308 is running on the wireless device 102, the user's docking preferences are loaded by the control module 308 (step 606). The docking preferences are settings previously set by the user, such as any time delay that should elapse before one of the docking application(s) 310 is executed, which docking application 310 is to be first executed, whether the user wishes to see the docking application control GUI 312 while the docking applications 310 are running, any security settings configured by the user, etc. In one example, the docking preferences may be stored as the user files or settings 316. Once the user's docking preferences have been loaded, the control module 308 waits until any delay period has elapsed (step 608). In one embodiment, a delay period is only used immediately after the wireless device 102 has been docked or cradled and may be set by the user as a delay time measured in minutes and seconds or as a number of power save cycles that occur on the wireless device 102. It will be understood by those skilled in the art that the steps 602, 604, and 606 occur relatively quickly (e.g., in a few seconds or less), while the delay step 608 typically lasts longer (e.g., the user may have configured a two minute delay).

Once any delay period has elapsed, one of the docking applications 310 is executed and shown on the display 142 (FIG. 1) of the wireless device 102 (step 610). The step 610 represents the continued execution of the docking application 610 that is loaded, and may additionally and optionally include the display of aspects of the docking application control GUI 312 for management and/or switching between one or more of the docking applications 310 and/or the implementation of the security policy administered by the security module 314. For example, if the picture frame application is running, the picture frame application continues to display a slideshow of picture files stored on the wireless device 102 (e.g., saved as the user files 316), the docking application control GUI 312 may show the user an interface allowing the user to select among the docking applications 310, and the security module 314 may ensure that only picture files that are not password protected or locked are shown on the display 142. Typically, the docking application 310 that is currently running will run for some time as the wireless device 102 sits on the user's desk as the user is focused on paperwork or other work using, for example, the computer 222. The docking application control module 308 continually monitors for the occurrence of two types of events. The control module 308 monitors to check if the wireless device 102 remains docked (step 612). If, for example, the user disconnects the wireless device 102 from the serial connection linking the device 102 with the computer 222, the docking application control module 308 and/or the docking application 310 that is currently running may be terminated (step 614). The control module 308 also monitors for input provided by the user, for example the user using the docking application control GUI 312 to select a different docking application 310 to be executed. If the user provides such input while one of the docking applications 310 is running, the user's docking preferences are updated at a step 618 (e.g., one of the docking preferences may be a setting indicating the application that the user currently wishes to use). The method 600 then returns to the step 606 and bypasses any delay at the step 608 since the wireless device 102 has not been newly docked.

While the present disclosure is primarily described as a method with a number of steps occurring in a particular order, a person of ordinary skill in the art will understand that the present disclosure is also directed to an apparatus for carrying out the disclosed method and including apparatus parts for performing each described method step, be it by way of hardware components, a computer programmed by appropriate software to enable the practice of the disclosed method, by any combination of the two, or in any other manner. The order of the steps described by the method are not intended to be limiting, and many of the steps may be performed at different times during the method without affecting the overall result of the method. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A method for managing a docking application running on a wireless device having a processor, the method comprising:
when the wireless device is coupled with another device, executing on the wireless device:
a docking application control module; and
a security module having a user configurable policy;
the docking application control module causing execution of the docking application,
the user configurable policy of the security module ensuring that the docking application does not cause display by the wireless device of user indicated secure, confidential, or sensitive data stored on the wireless device when said docking application control module is active; and
when the wireless device ceases to be coupled to the other device, terminating, by the docking application control module, the docking application,
the method further comprising:
executing a docking application control graphical user interface (GUI), the docking application control GUI providing with the docking application a user interface to control one or more aspects of the docking application;
monitoring for and receiving input to the docking application control GUI;
updating user preferences associated with the docking application based on the input received; and
adjusting the operation of the docking application based on the updated user preferences.

2. The method according to claim 1, further comprising, before said docking application control module causes execution of said docking application:
waiting for a delay period to elapse, the delay period being defined by user preferences associated with the wireless device.

3. The method according to claim 2, wherein the delay period is defined by a predetermined number of power save cycles that occur on the wireless device.

4. The method according to claim 1, wherein the other device is selected from the group consisting of a charger providing power to the wireless device through a cable, a charger providing power to the wireless device through an inductive coupling, a computing device connected to the wireless device with a serial cable, and a computing device connected to the wireless device with a wireless connection.

5. The method according to claim 1, wherein the docking application includes one of: an alarm clock application that shows the time and date and provides an option to set alarms; a picture frame application that shows a selection of pictures; an animated picture viewer that shows animated pictures; a data download portal that provides an option to download items of interest from a network connection; a media player application that provides an option to listen to and/or view media files; or a display notification application that shows email or messaging notifications.

6. The method according to claim 1, wherein the docking application control GUI provides an interface integrated with the docking application, the interface allowing selection of another docking application for use on the wireless device or an option to run more than one docking application at the same time on the wireless device.

7. The method according to claim 1, wherein the docking application control GUI provides an interface integrated with the docking application, the interface allowing configuration of settings associated with the docking application.

8. A wireless device, comprising:
a port for providing an option of coupling the wireless device with another device;
a display device for communicating output; and
a processor coupled to the port and the display device, and configured to:
when the wireless device is coupled with the other device:
execute a docking application control module; and
execute a security module having a user configurable policy;
the docking application control module causing execution of a docking application,
the user configurable policy of the security module ensuring that the docking application does not cause display on the display device of user indicated secure, confidential, or sensitive data stored on the wireless device when said docking application control module is active; and
when the wireless device ceases to be coupled to the other device, terminate, by the docking application control module, the docking application,
the processor being further configured to:
execute a docking application control graphical user interface (GUI), the docking application control GUI providing with the docking application a user interface on an input device of the wireless device to control one or more aspects of the docking application;
monitor for and receive input provided to the docking application control GUI;
update user preferences associated with the docking application based on the input received; and
adjust operation of the docking application based on the updated user preferences.

9. The wireless device according to claim 8, wherein the processor is further configured to, before said docking application control module causes execution of said docking application:
wait for a delay period to elapse, the delay period being defined by user preferences associated with the wireless device.

10. The wireless device according to claim 9, wherein the delay period is defined by a predetermined number of power save cycles that occur on the wireless device.

11. The wireless device according to claim 8, wherein the other device is selected from the group consisting of a charger providing power to the wireless device through a cable, a charger providing power to the wireless device through an inductive coupling, a computing device connected to the port with a cable, and a computing device connected to a communication subsystem of the wireless device with a wireless connection.

12. The wireless device according to claim 8, wherein the docking application includes one of: an alarm clock application that shows the time and date and provides an option to set alarms; a picture frame application that shows a selection of pictures; an animated picture viewer that shows animated pictures; a data download portal that provides an option to download items of interest from a network connection; a media player application that provides an option to listen to and/or view media files; or a display notification application that shows email or messaging notifications.

13. The wireless device according to claim 8, wherein the docking application control GUI provides an interface integrated with the docking application, the interface allowing selection of another docking application for use on the wireless device or an option to run more than one docking application at the same time.

14. The wireless device according to claim 8, wherein the docking application control GUI provides an interface integrated with the docking application, the interface allowing configuration of settings associated with the docking application.

\* \* \* \* \*